(12) United States Patent
Xie

(10) Patent No.: US 12,470,509 B2
(45) Date of Patent: Nov. 11, 2025

(54) TIMELY MESSAGE ORCHESTRATION USING MESSAGING QUEUE

(71) Applicant: eBay Inc., San Jose, CA (US)

(72) Inventor: Zixiao Xie, Pudong New Area (CN)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 18/387,503

(22) Filed: Nov. 7, 2023

(65) Prior Publication Data

US 2025/0150424 A1 May 8, 2025

(51) Int. Cl.
*H04L 51/226* (2022.01)
(52) U.S. Cl.
CPC ................... *H04L 51/226* (2022.05)
(58) Field of Classification Search
CPC .................................................... H04L 51/226
See application file for complete search history.

(56) References Cited

U.S. PATENT DOCUMENTS

| 9,112,820 | B2 | 8/2015 | Ziegler | |
|---|---|---|---|---|
| 2014/0036695 | A1* | 2/2014 | Ziegler | H04L 49/901 370/252 |
| 2016/0173238 | A1* | 6/2016 | Naaman | H04L 1/1621 714/749 |

OTHER PUBLICATIONS

"Amazon SQS Delay Queues", Amazon Web Services, (2023), 2 pgs.
Papreja, Siddharth, "Retry Mechanism And Delay Queues in Apache Kafka", Naukri Engineering, (Jun. 14, 2019), 16 pgs.
Tarantool, "How A Distributed Amazon SQS Compatible Queue Works", (Jan. 18, 2022), 23 pgs.

\* cited by examiner

*Primary Examiner* — Andrew C Georgandellis
(74) *Attorney, Agent, or Firm* — SCHWEGMAN LUNDBERG & WOESSNER, P.A.

(57) ABSTRACT

A method of creating a delay queue architecture for relaying messages between a producer and a consumer is provided. The method includes creating an ordered sequence of delay queues. Each delay queue is assigned in the ordered sequence based on a fixed delay time associated with each delay queue. A first message is assigned to a first delay queue of the delay queues in the ordered sequence and a second message is assigned to a second delay queue of the delay queues. The first and second messages have time delays and are assigned to the first and second delay queues based on the time delays. A passage of a first-time delay is detected and the second message is moved to the first delay queue based on the passage of the first-time delay.

17 Claims, 13 Drawing Sheets

TIMELY MESSAGE ORCHESTRATION USING MESSAGING QUEUE

TECHNICAL FIELD

Examples of the present disclosure relate generally to a queue for relaying messages between a producer and a consumer and, more particularly, but not by way of limitation, to configuring a variable and scalable queue for relaying messages between a producer and a consumer.

BACKGROUND

When a producer and a consumer complete a transaction, the producer and the consumer exchange messages related to the sale with each other through a message queue. The messages can include confirmation of a payment being sent to an account associated with one of the producer or the consumer. The message can also include one of the producer or the consumer confirming receipt of the payment. On occasion, messages between the producer and consumer can be delayed. Moreover, the consumer of the message may request that the message be resent. Thus, a retry will occur where an attempt will be made to try and send the message again.

A delay time can be established after which the delayed message should be resent. Thus, if a delay of five minutes is established, after the delayed message has been in the message queue for five minutes, an attempt will be made to send the message.

Typically, the message queue can implement either a memory queue/time wheel schema or a delay queue schema to distribute delayed messages. In the memory queue/time wheel schema, messages are placed in a memory device. The messages are sorted in the memory device based on the delay time. Thus, the messages are ordered such that the messages having the shortest delay time are scheduled to be sent before messages having a longer delay time. However, in the memory queue/time wheel schema, all the messages must be first sorted according to their delay time. Moreover, enough memory must be allocated to allow for storage of all the delayed messages. As such, the memory queue/time wheel schema is limited by memory capacity and therefore has limited scalability.

In the delay queue schema, delay queues are assigned for different time delays. Therefore, if time delays of five minutes, ten minutes, and fifteen minutes have been assigned by producers and/or consumers for delayed messages and message retries, three delay queues are created. A first delay queue where messages having a delay time of five minutes are stored is created. A second delay queue where messages having a delay time of ten minutes are stored is created. Furthermore, a third delay queue where messages having a delay time of fifteen minutes are stored is created. However, in the delay queue schema, the delay times are fixed once the delay queues are established. Thus, once the delay queues are established for five, ten, and fifteen minutes, if a delay time of one minute is required, one of the delay queues that have already been provisioned in the message queue cannot be used. This lack of variability can create problems in scenarios where a message must be received in a time period that is different than what is provided by the delay queues, such as if payment in a transaction must be received in one minute or the transaction is voided, but the shortest delay queue is five minutes, which could potentially void the transaction.

SUMMARY

A method and system for providing a delay queue architecture having an ordered sequence of delay queues that is highly scalable, variable, and enables high throughout for messages sent between a producer and a consumer is described. Each of the delay queues can be associated with a fixed delay time that can vary with each delay queue. The fixed delay time can be a function of a delay time associated with a delay queue from which messages are sent directly to the consumer and a position of the delay queue within the delay queue architecture relative to the delay queue from which messages are sent directly to the consumer.

Once the delay queue architecture is created, messages are assigned to the delay queues within the delay queue architecture based on a target delivery time associated with each of the messages. The target delivery time can relate to a time at which the message will be sent to the consumer. The fixed delay time for each of the delay queues can be a range and the target delivery time for each of the messages can be used to assign the messages in each of the delay queues based on the target delivery time falling within the range associated with the delay queues.

The messages can be moved from the assigned delay queues to other delay queues after a passage of time. The ranges associated with each of the fixed delay times can be defined by a lower bound and an upper bound. A determination can be made regarding which of the messages have a target delivery time that is closest to an upper bound of a preceding delay queue or is closest to zero, which can be the lower bound for the delay queue from which messages are sent directly to the consumer. A difference between the target delivery time that is closest to the upper bound of a preceding delay queue or is closest to zero is determined as a first time delay. After passage of the first time delay, messages having the target delivery time that are within an upper bound and a lower bound of a preceding delay queue or is zero is either moved to the preceding delay queue or sent to a consumer. The process of determining which of the remaining messages have a target delivery time that is within an upper bound and a lower bound of a preceding delay queue or zero, determining a time delay, and moving the message after the passage of the time delay can be repeated.

BRIEF DESCRIPTION OF THE DRAWINGS

Various ones of the appended drawings merely illustrate examples of the present disclosure and should not be considered as limiting its scope.

DETAILED DESCRIPTION

Figure 1:
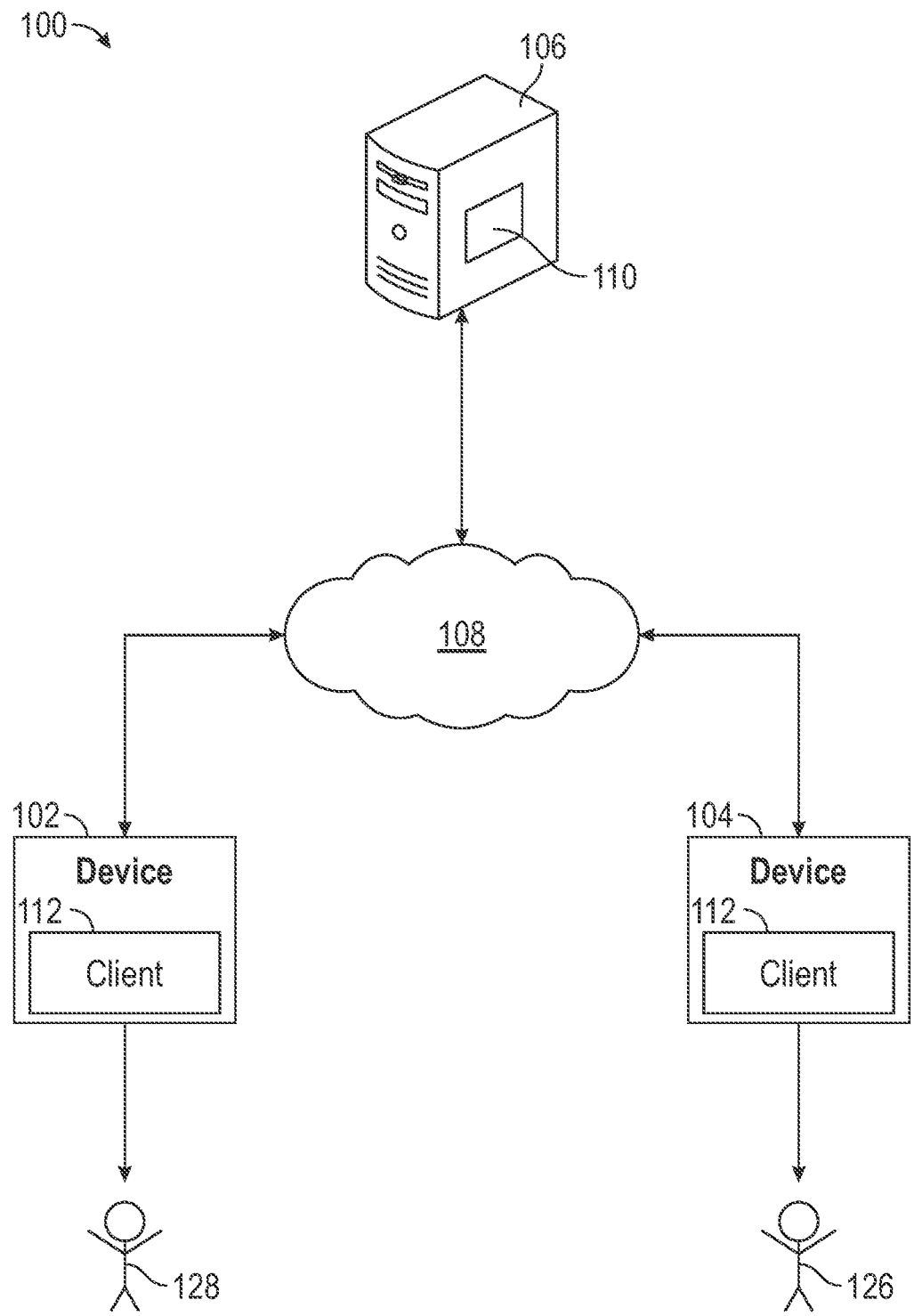
FIG. 1 is a network diagram illustrating a network environment suitable for providing a delay queue architecture and relaying messages between a producer and a consumer, according to some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

A method and system for providing a delay queue architecture having an ordered sequence of delay queues that is highly scalable, variable, and enables high throughout for messages sent between a producer and a consumer is described. Each of the delay queues can be associated with a fixed delay time that can vary with each delay queue. The fixed delay time can be a function of a delay time associated with a delay queue from which messages are sent directly to the consumer and a position of the delay queue within the delay queue architecture relative to the delay queue from which messages are sent directly to the consumer.

Once the delay queue architecture is created, messages are assigned to the delay queues within the delay queue architecture based on a target delivery time associated with each of the messages. The messages can be moved from the assigned delay queues to other delay queues after a passage of time. The ranges associated with each of the fixed delay times can be defined by a lower bound and an upper bound. A determination can be made regarding which of the messages have a target delivery time that is closest to an upper bound of a preceding delay queue or is closest to zero, which can be the lower bound for the delay queue from which messages are sent directly to the consumer. After passage of the first time delay, messages having the target delivery time that are within an upper bound and a lower bound of a preceding delay queue or is zero is either moved to the preceding delay queue or sent to a consumer. The process of determining which of the remaining messages have a target delivery time that is within an upper bound and a lower bound of a preceding delay queue or zero, determining a time delay, and moving the message after the passage of the time delay can be repeated.

Examples provide a solution to technical problems that can occur in computing environments. In particular, as discussed above, memory capacity of a computing device limit scalability of a computing device in a memory queue/time wheel schema discussed above. Moreover, delay queues in computing devices have fixed delay times which are not adjustable. The methods and systems disclosed herein address the technical problem of memory capacity and memory architecture limiting message queuing and message delivery timing by providing separate delay queues that can each hold messages based on a delay time that can be fixed for a particular application. The delay queues have different delay times associated therewith, which allow for the segregation of messages into the different delay queues based on a delay time. Thus, memory is not wasted on continually sorting messages since this is automatically done with the use of the delay queues having different delay times associated therewith. Furthermore, the delay times can be adjusted such that the delay queues can have different delay times associated therewith based on various decision factors, as will be detailed further on.

FIG. 1 is a network diagram illustrating a network environment 100 suitable for providing a delay queue architecture and relaying messages between a producer device 102 and a consumer device 104. The environment 100 can include a server 106 communicatively coupled with the producer device 102 and the consumer 104 device via a network 108. The server 106 can facilitate relaying messages between the producer device 102 and the consumer device 104 via a delay queue architecture 110.

The producer device 102 and the consumer device 104 can be any computing device suitable for use by a user. For example, the devices 102 and 104 can be a desktop computer, a tablet computer, a portable media device, or a smart phone belonging to a user. The producer device 102 and the consumer device 104 can interact with the server 106 using a client 112. The client 112 can be a web browser, which allows for communication between a device, such as the producer device 102 and/or the consumer device 104, with a web server. In particular, the client can allow users 126 and 128 associated with the producer device 102 or the consumer device 104, such as a buyer, to make a request and then show a result of the request. The client 112 can be an application client that can be a standalone application that can run on one or both of the producer device 102 and the consumer device 104 and communicates with a remote server to employ the services on the remote server, such as a Bluetooth™ client application, or the like.

The network 108 can be any network that enables communication between or among machines, databases, and devices (e.g., the producer device 102 and the consumer device 104). Accordingly, the network 108 can be a wired network, a wireless network (e.g., a mobile or cellular network), or any suitable combination thereof. The network 108 can include one or more portions that constitute a private network, a public network (e.g., the Internet), or any suitable combination thereof.

Figure 2:
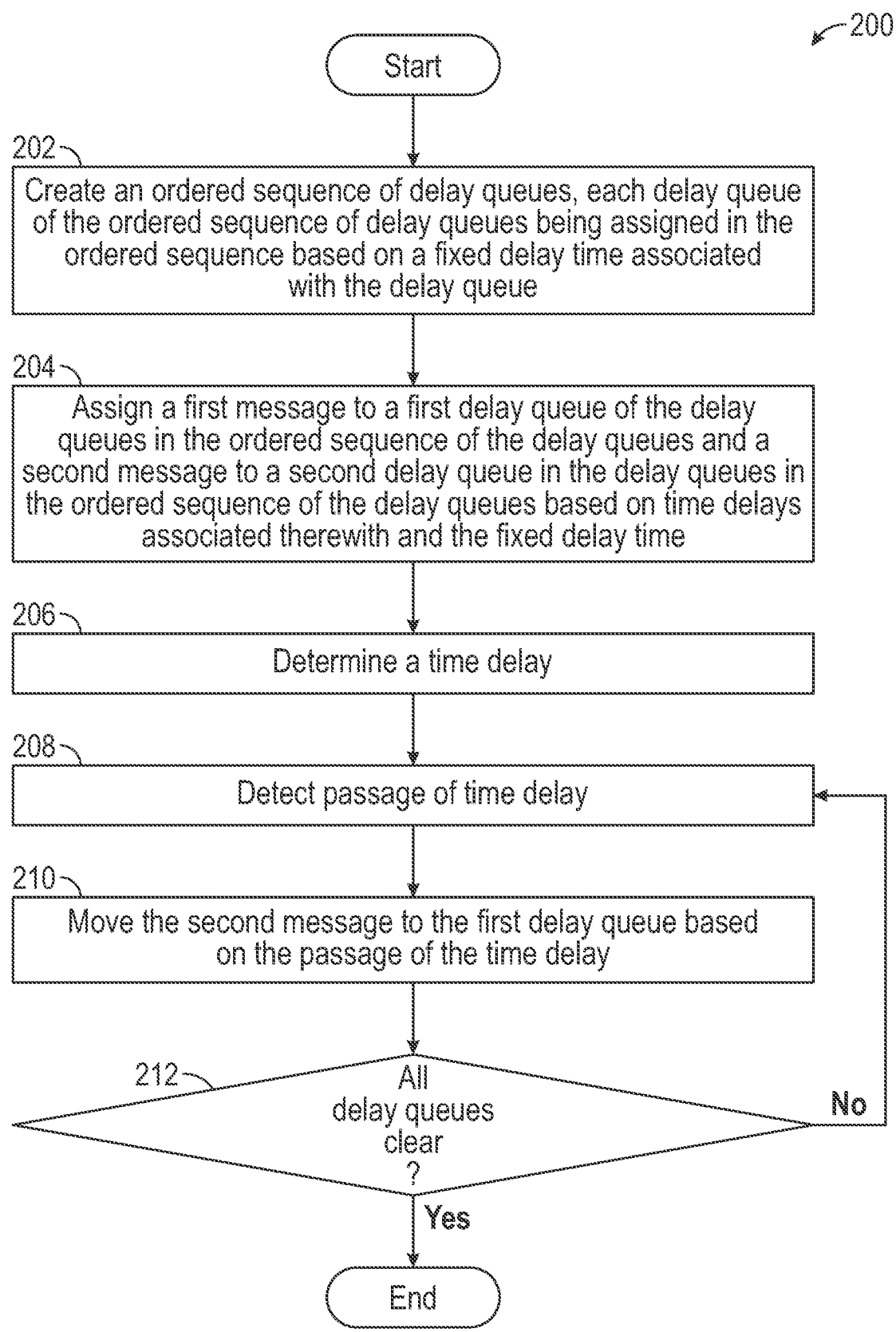
FIG. 2 illustrates a method for creating a delay queue architecture, such as the delay queue architecture shown in FIG. 1, and providing messages to a consumer, according to some examples.
Figure 3:
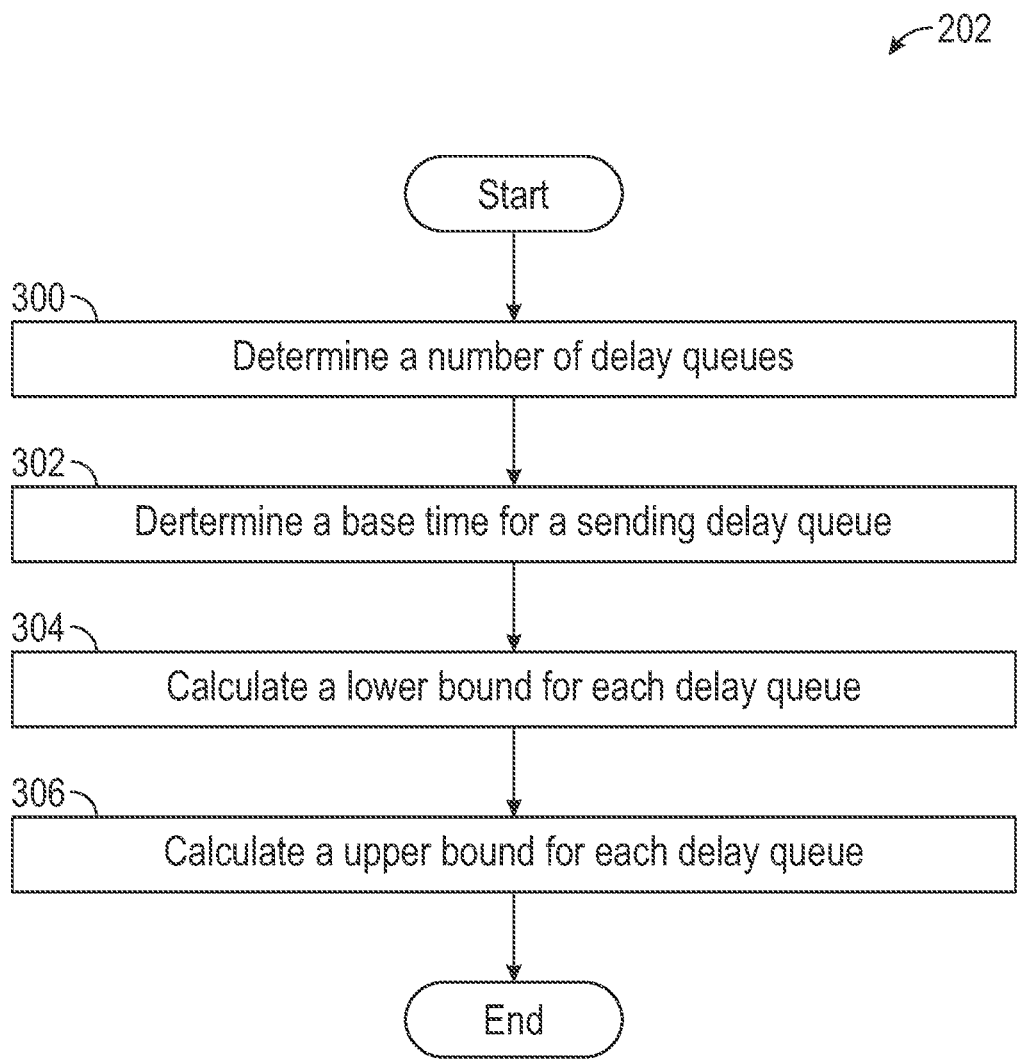
FIG. 3 shows a method for creating a delay queue architecture, according to some examples.

In examples, the server 106 can function to create to the delay queue architecture 110. The delay queue architecture 110 can implement any type of distributed messaging queue platform that can handle high-throughout, low-latency data streaming. Examples can include Apache Kafka or Apache Pulsar where delay queues of the delay queue architecture can be distributed among different nodes. Now making reference to FIG. 2, a method 200 for creating a delay queue architecture, such as the delay queue architecture 110, and providing messages to a consumer is shown. The delay queue architecture can be a distributed messaging queue that can be formed by multiple delay queues where an operation 202 is performed to create an ordered sequence of delay queues. Each delay queue of the ordered sequence of delay queues can be assigned in the ordered sequence based on a fixed delay time associated with the delay queue. Making reference to FIG. 3, an example of the operation 202 is shown.

During an operation 300, a number of delay queues for the delay queue architecture is determined. The number of delay queues within the delay queue architecture 110 can be user selected, such as a user associated with the server 106, or automatically selected based on any number of factors, referred to herein as "decision factors." The decision factors can include a historic volume of message traffic between the producer device 102 and the consumer device 104, a type of transaction occurring between the producer device 102 and the consumer device 104, traffic typically associated with transactions between the producer device 102 and the consumer 104, or the like. Any number of delay queues can be selected for the delay queue architecture during the operation 300.

Creating an ordered sequence of delay queues can also include an operation 302 where a base time for a sending delay queue can be determined. The sending delay queue can refer to the delay queue from which messages are sent to a consumer from the delay queue architecture. The sending delay queue can be the delay queue having the shortest fixed delay time. The fixed delay time for the sending delay queue can be the base time. The base time can be a delay that is applied to a message before the message is sent from the sending delay queue to a consumer. To further illustrate, the base time can be one minute, where a message that is stored in the sending delay queue can be delayed by one minute before being sent to a consumer. The base time can be selected based on the decision factors described above or can be selected by one of the users 126 or 128. While the operation 302 is shown as occurring after the operation 300, the operation 302 can be performed before the operation 300 or simultaneously with the operation 300.

Figure 4:
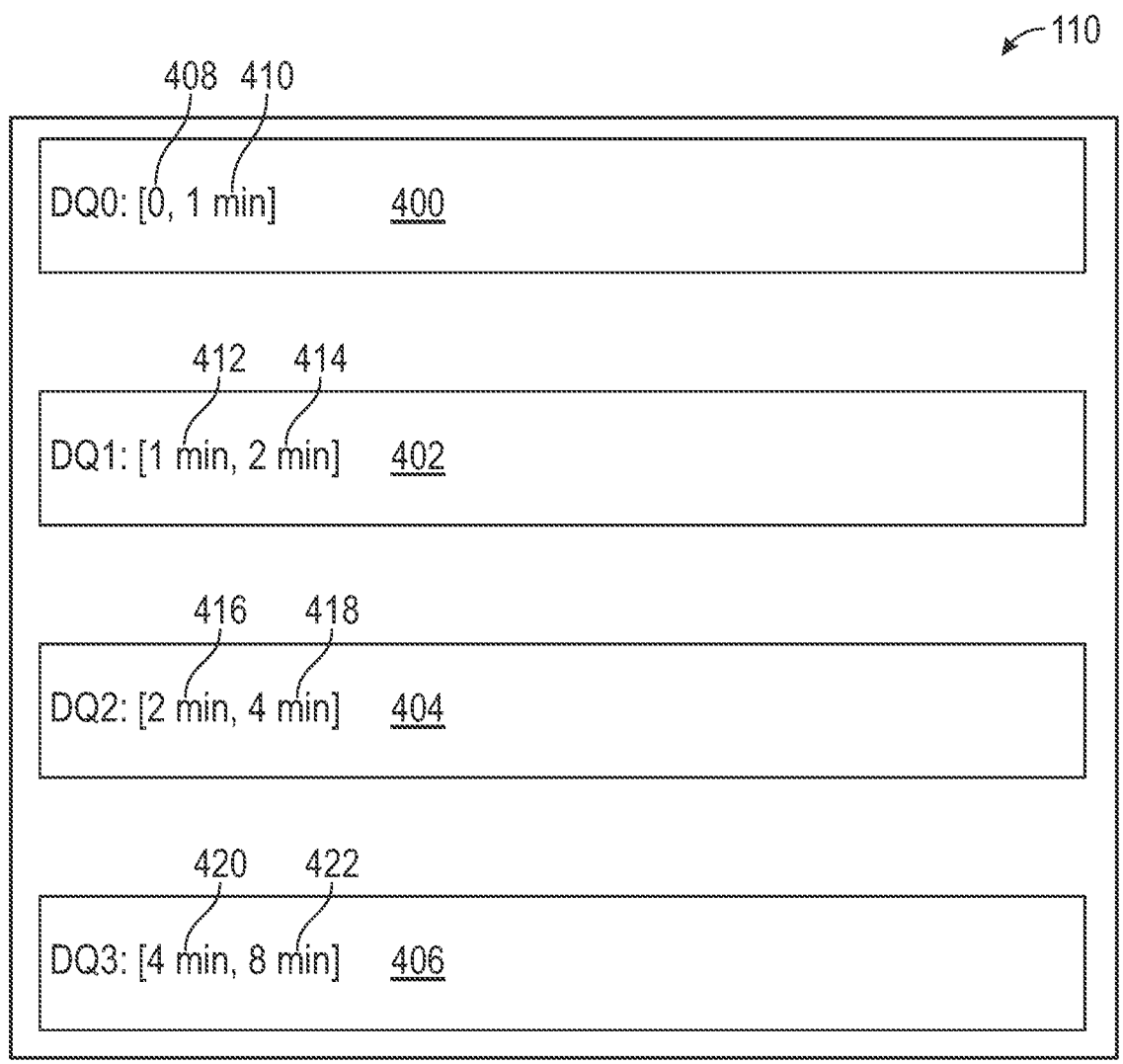
FIG. 4 is a schematic diagram of the delay queue architecture of FIG. 1, according to some examples.

As an example of creating an ordered sequence of delay queues, reference is made to FIG. 4, which shows the delay queue architecture 110. In the example as discussed with reference to FIGS. 4-14 herein, the server 106 can perform some or all of the operations discussed with reference to FIGS. 2 and 3 as they are described with reference to FIGS. 4-14. During the operation 300, a determination is made that the delay queue architecture 110 should include four delay queues 400-406. In the example, the determination is made based on a historic volume of message traffic between the producer 102 and the consumer 104. In addition, the delay queue 400 can be selected as the sending delay queue. Accordingly, the delay queue 400 can send messages from the delay queue architecture 110 directly to the consumer 104. During the operation 302, a base time of one minute can be determined using the historic volume of message traffic between the producer 102 and the consumer 104. Thus, the delay time before sending a message from the delay queue 400 to the consumer 104 is one minute.

Returning to FIG. 3, after the operation 302, an operation 304 can be performed, where a lower bound can be calculated for each delay queue in the delay queue architecture. Moreover, during an operation 306, an upper bound can be calculated for each delay queue in the delay queue architecture. For the sending delay queue, the lower bound can be set to zero, which can correspond to zero minutes left until a message is to be sent to a consumer such that the message should be sent to the consumer. Furthermore, for the sending delay queue, the upper limit can be set to correspond with the base time. As such, if the time delay is two minutes, the upper bound for the sending delay queue can be two minutes. As will be discussed further on, a message can be moved between each of the delay queues where the message can be moved from an assigned delay queue to a preceding delay queue after a passage of time based on the upper and lower bounds of preceding delay queues. The message can be associated with a target delivery time, which can relate to when the message should be sent to a consumer. The target delivery time can also be used to determine when the message can be moved to a preceding delay queue where the target delivery time can be adjusted based on an elapsed time, as will be discussed in greater below further on.

Each of the lower bound and the upper bound for a particular delay queue can be calculated as a function of the base time and a position of the particular delay queue within the delay queue architecture using a detector at each of the delay queues. The detector can implement algorithms that can be used to calculate a lower bound and an upper bound. An example of an algorithm that can be used to calculate the lower bound can be:

$$t_o * 2^{(DQ\#-1)} \quad (1)$$

Here, $t_o$ can refer to the base time and DQ# can refer to the number of the delay queue in the delay queue architecture, where the sending delay queue has the number zero.

An example of an algorithm that can be used to calculate the upper bound can be:

$$t_o * 2^{(DQ\#)} \quad (2)$$

Moreover, for the delay queue that is the sending delay queue and is the zero delay queue, the lower bound can be defined as the numeral zero while the upper bound can be defined as the base time $t_o$.

Turning back to the example, for the delay queue 400, during the operation 304, since this is the sending delay queue, this can correspond to the zero delay queue (DQ0) with a lower bound 408 set at zero minutes. In the example, the base time is one minute. Thus, an upper bound 410 for the delay queue 400 can be one minute. For the delay queue 402, which in the example corresponds to the first delay queue (DQ1), a lower bound 412 can be one minute, which can be calculated by a detector 403 using equation (1) where DQ#=1. In addition, an upper bound 414 can be two minutes, which can be calculated using equation (2) by the detector 403 where DQ#=1. For the delay queue 404, which in the example corresponds to the second delay queue (DQ2), a lower bound 416 can be two minutes, which can be calculated using equation (1) by a detector 405 where DQ#=2. An upper bound 418 can be four minutes, which can be calculated using equation (2) by the detector 405 where DQ#=2. For the delay queue 406, which in the example corresponds to the third delay queue (DQ3), a lower bound 420 can be four minutes, which can be calculated using equation (1) by a detector 407 where DQ#=3. In addition, an upper bound 422 can be eight minutes, which can be calculated using equation (2) by the detector 407 where DQ#=3. The lower bounds 408, 412, 416, and 420 for each of the delay queues 400-406 can correspond to a starting time period for each of the delay queues 400-406. Furthermore, the upper bounds 410, 414, 418, and 422 can correspond to a starting time period for each of the delay queues 400-406.

Returning attention to FIG. 2, after the ordered sequence of delay queues is created during an operation 202, the method 200 can perform an operation 204, where messages can be assigned to each delay queue based on a target delivery time of each message and the lower and upper bounds of each delay queue. The target delivery times can be assigned using the decision factors. To further illustrate, the type of transaction occurring between the users 126 and 128 can dictate the target delivery time. If the user 126 has purchased an item from the user 128, a time period of thirty minutes can be established within which the user 126 can pay for the item. The time period of thirty minutes can be set as the target delivery time, where, after thirty minutes have elapsed, the order will be closed. The target delivery time can be compared against the lower bound and the upper bound of each delay queue in the delay queue architecture to determine in which delay queue the message should be placed.

The messages to be assigned to each delay queue can be temporarily stored in a message queue having a head end and a tail end. Messages can be stored in the message queue beginning at the message queue head end in an order in which the messages are received at the message queue. Thus, a message that arrives first at the message queue can be stored at the message queue head end while a message that arrives last at the message queue prior to assignment can be stored closest the message queue tail end. The positioning of the messages in the message queue relative to the message queue head end and the message queue tail end can be used to dictate how messages will be assigned to each delay queue. In particular, the messages are assigned to the delay queues in the order in which they are stored at the message queue. As such, messages closest to the message queue head end will be assigned to a respective delay queue before messages closer to the message queue tail end. Therefore, the messages nearest the message queue head end will be closer to a head end of the delay queue to which the messages are assigned while messages closer to the message queue tail end will be closer to a tail end of the delay queue to which messages are assigned.

Figure 5:
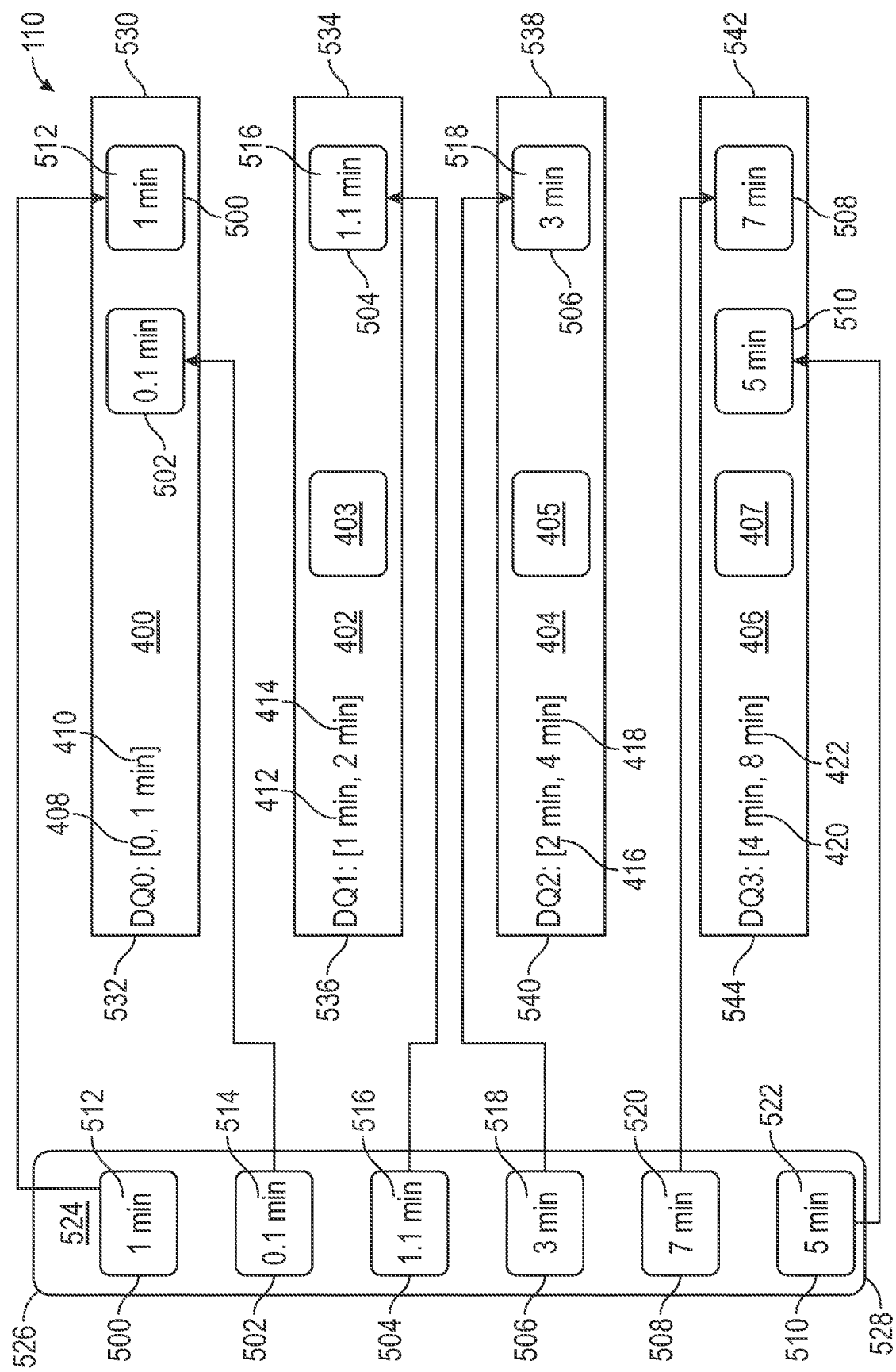
FIG. 5 illustrates the assignment of messages to the delay queue architecture of FIG. 5, according to some examples.

In the example, in FIG. 5, messages 500-510 are to be distributed to the delay queues 400-406 of the delay queue architecture 110. Each of the messages 500-510 can include target delivery times 512-522. The target delivery times 512-522 can be used to assign the messages 500-510 to ones of the delay queues 400-406 based on the lower bounds 408, 412, 416, and 420 along with the upper bounds 410, 414, 418, and 422. Moreover, the messages 500-510 can be cached in a message queue 524 prior to being assigned to the delay queues 400-406. The messages 500-510 can be cached in an order of being received beginning from a head end 526 of the message queue 524 to a tail end 528 of the message queue 524.

The delay queue 400 has the lower bound 408 of zero minutes and the upper bound 410 of one minute. The message 500 has the target delivery time 512 of one minute and the message 502 has the target delivery time 514 of 0.1 minute, which falls between the lower bound 408 and the upper bound 410. Therefore, the messages 500 and 502 can be assigned to the delay queue 400 during the operation 204. In addition, since the message 500 is nearer the message queue head end 526, the message 500 is placed first in the delay queue 400 at a head end 530 of the delay queue 400 and the message 502 is placed in the delay queue 400 after the message 500 nearer a tail end 532 of the delay queue 400. Here, the message 500 can be the first logical message among the messages 500 and 502.

The delay queue 402 has the lower bound 412 of one minute and the upper bound 414 of two minutes. The message 504 has the target delivery time 516 of 1.1 minutes. As such, the message 504 can be assigned to the delay queue 402 during the operation 204. The delay queue 404 has the lower bound 416 of two minutes and the upper bound 418 of four minutes. The message 506 has the target delivery time 518 of 3 minutes, which falls between the lower bound 416 of two minutes and the upper bound 418 of four minutes. Accordingly, the message 506 can be assigned to the delay queue 404 during the operation 204.

The delay queue 406 has the lower bound 420 of four minutes and the upper bound 422 of eight minutes. The message 508 has the target delivery time 520 of seven minutes and the message 510 has the target delivery time 522 of five minutes, which fall between the lower bound 420 of four minutes and the upper bound 422 of eight minutes. Thus, the messages 508 and 510 can be assigned to the delay queue 406 during the operation 204. Here, the message 508 is closer to the message queue head end 526 and the message 508 is placed first in the delay queue 406 at a head end 542 of the delay queue 404. The message 510 is placed in the delay queue 404 after the message 508 closer a tail end 544 of the delay queue 406.

Once the delay queue architecture has been created and messages have been assigned to the delay queues in the delay queue architecture, the method 200 performs an operation 206, where a time delay can be determined. As discussed above, a position of the messages assigned to the delay queues can be dictated by a position of messages in message queues, where messages nearest a message queue head end are closest to a delay queue head end after assignment. During the operation 206, each of the detectors associated with each of the delay queues can compare the target delivery time associated with the messages nearest the delay queue head end with the upper bound of any of the preceding delay queues. Thus, target delivery times can be compared against the upper bounds of all preceding delay queues in addition to a delay queue that immediately precedes the delay queue of the message for which the target delivery time is being compared. For the messages in the sending delay queue a time to zero is determined for the target delivery time of the message nearest the sending delay queue head end. The time to zero can mean the difference between the target delivery time and zero minutes. Thus, if a target delivery time is 0.9 minutes, the time to zero would be 0.9 minutes. A difference can be determined between the target delivery time of each of the messages located nearest the delay queue head end and the upper bound of any preceding delay queue. The smallest difference determined by each of the detectors can be used as a value for the time delay. After the time delay is determined, the method 200 performs an operation 208, where a passage of this time delay is detected.

Returning to the example and FIG. 5, during the operation 206, each of the detectors 403, 405, 407 and 600 (FIG. 6) compare the target delivery times associated with each of the messages 500, 504, 506, and 508 against the upper bounds of the preceding delay queues 400, 402, and 404 along with a time to zero minutes. In the example, since the message 500 is closest to the delay queue head end 530, the detector 600 determines the time to zero of the target delivery time 512, which is one minute. Here, a determination is made that the time to zero is the difference between one minute and zero minutes, which is one minute, during the operation 206.

For the delay queue 402, the message 504 is closest to the delay queue head end 534. As such, the detector 403 determines a difference between the target delivery time 516 and the upper bound 410 of the delay queue 400 since the delay queue 400 precedes the delay queue 402. The detector 403 can determine that a difference between the target delivery time of 1.1 minutes for the message 504 and the upper bound 410 of 1.0 minutes is 0.1 minutes during the operation 206.

With respect to the delay queue 404, the message 506 is closest to the delay queue head end 550. The delay queue is preceded by the delay queue 402. Therefore, the detector 405 determines a difference between the target delivery time 518 and the upper bound 414. The target delivery time 518 has a value of three minutes while the upper bound 414 has a value of two minutes. As such, the detector 405 determines that the difference is one minute.

For the delay queue 406, the message 508 is closest to the delay queue head end 542. Accordingly, the detector 407 can determine a difference between the target delivery time 520 and the upper bound 418 of the delay queue 404 since the delay queue 404 precedes the delay queue 406. The detector 407 can determine that a difference between the target delivery time of seven minutes for the message 508 and the upper bound 418 of four minutes is three minutes during the operation 206.

The differences determined by each of the detectors 403, 405, 407, and 600 can be compared to determine the smallest difference. In the example, the difference of 0.1 minutes between the target delivery time 522 and the upper bound 410 is the lowest difference. Thus, during the operation 206, a time delay of 0.1 minutes is determined. Once the time delay is determined, the detectors 403, 405, 407, and 600 can determine a passage of 0.1 minutes during the operation 208 in the example.

After the passage of the time delay is detected during the operation 208, the method 200 performs an operation 210 where the second message is moved to the first delay queue based on the passage of the time delay. The second message can be moved based on the lowest difference determined between the target delivery time of the messages at delay queue head ends and the upper bounds of the preceding delay queues. After the passage of the time delay in the operation 208, the amount of the delay time that has passed can be subtracted from each of the target delivery times of the messages. The new target delivery times are compared against the lower and upper bounds of any preceding delay queues. If the new target delivery times for the messages fall into a range defined by the lower and upper bounds of any preceding delay queues, the message with the new target delivery time can be moved into the preceding delay queue having a range within which the new target delivery times fall. Similarly, if a new target delivery time is zero minutes, the message having the target delivery time of zero minutes can be sent to the consumer from the sending delay queue. If the message having the target delivery time of zero minutes is not in the sending delay queue, the message having the target delivery time of zero can be moved to the sending delay queue and then sent to the consumer when the message at the sending delay queue head end. In further examples, the delay queue having the message that includes the zero delivery time can move the message directly to a consumer queue. Thus, if any of the delay queues 402, 404, or 406 have a message that includes a zero delivery time, any of the delay queues 402, 404, or 406 can move the message directly to the consumer.

Figure 6:
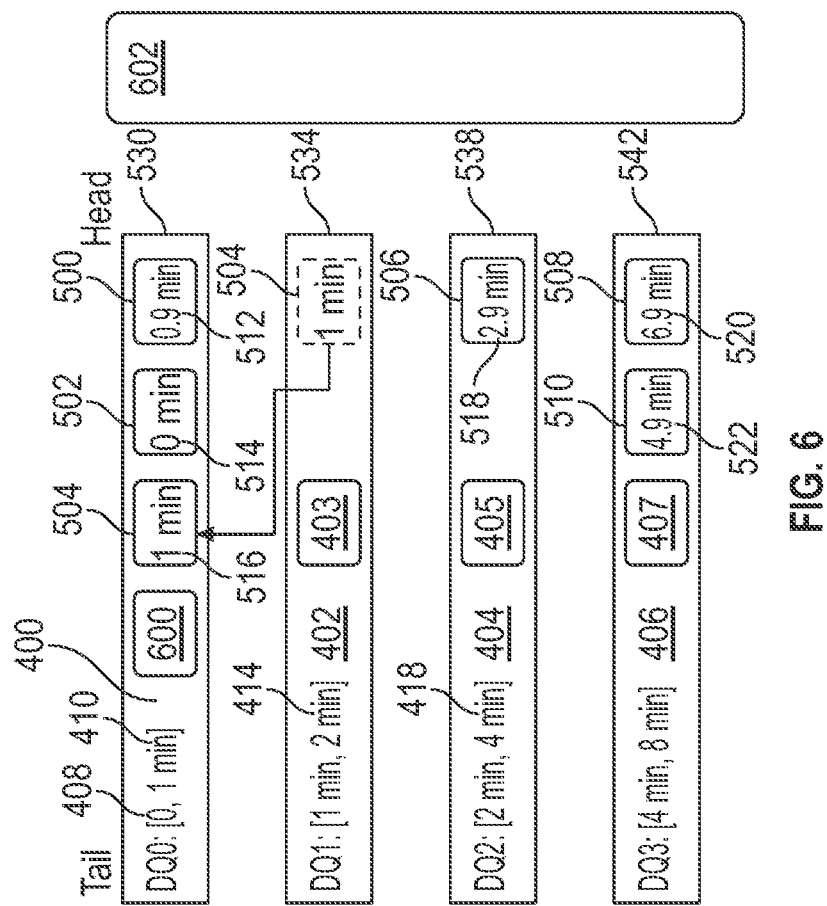
FIGS. 6-14 show the movement of messages among delay queues of the delay queue architecture of FIG. 1 and the delivery of messages to a consumer, according to some examples.

Returning to the example, the passage of time is 0.1 minutes. Thus, 0.1 minutes is subtracted from each of the target delivery times 512-522 of the messages 500-510 during the operation 210 such that the target delivery time 512 of the message 500 is 0.9 minutes, the target delivery time 514 of the message 502 is 0.0 minutes, the target delivery time 516 of the message 504 is 1.0 minutes, the target delivery time 518 of the message 506 is 2.9 minutes, the target delivery time 520 of the message 508 is 6.9 minutes, and the target delivery time 522 of the message 510 is 4.9 minutes, as shown in FIG. 6.

Since the target delivery time 512 of the message 504 is now 1.0 minutes, the detector 403 determines that the target delivery time 512 is within the range of the lower bound 408 and the upper bound 410. As such, the detector 403 facilitates movement of the message 504 from the delay queue 402 to the delay queue 400. In FIG. 6, the target delivery time 514 of the message 502 is 0.0 minutes. However, the message 500 separates the message 502 from the delay queue head end 530. Thus, the detector 600 does not move the message 502 from the sending delay queue 400 to a consumer queue 602. In the example, no other messages have a target delivery time that falls within a range of a preceding delay queue. Accordingly, the detectors 405 and 407 do not move any of the messages 506-510 to any preceding queues.

Returning attention to FIG. 2, after completion of the operation 210, the method 200 can perform an operation 212, where a determination is made if all delay queues have been cleared. If a determination is made that all delay queues have been cleared, the method 200 is complete. Otherwise, the method 200 repeats operations 208 and 210.

In the example, a determination is made during the operation 212 that the delay queues 400, 404, and 406 include the messages 500-510. Thus, the operations 208 and 210 are repeated. Here, a determination is made that the delay time is 0.9 minutes using the methodologies discussed above, i.e., each of the detectors 403, 405, and 407 compare the target delivery times 518 and 520 associated with the messages \506 and 520 that are nearest the delay queue head ends 538 and 542 with the upper bounds 410, 414, and 418 of the delay queues 400, 402, and 404 while the detector 600 compares the time to zero of the target delivery time 512 of the message 500. Moreover, during the operation 208, a passage of 0.9 minutes is detected.

Figure 7:
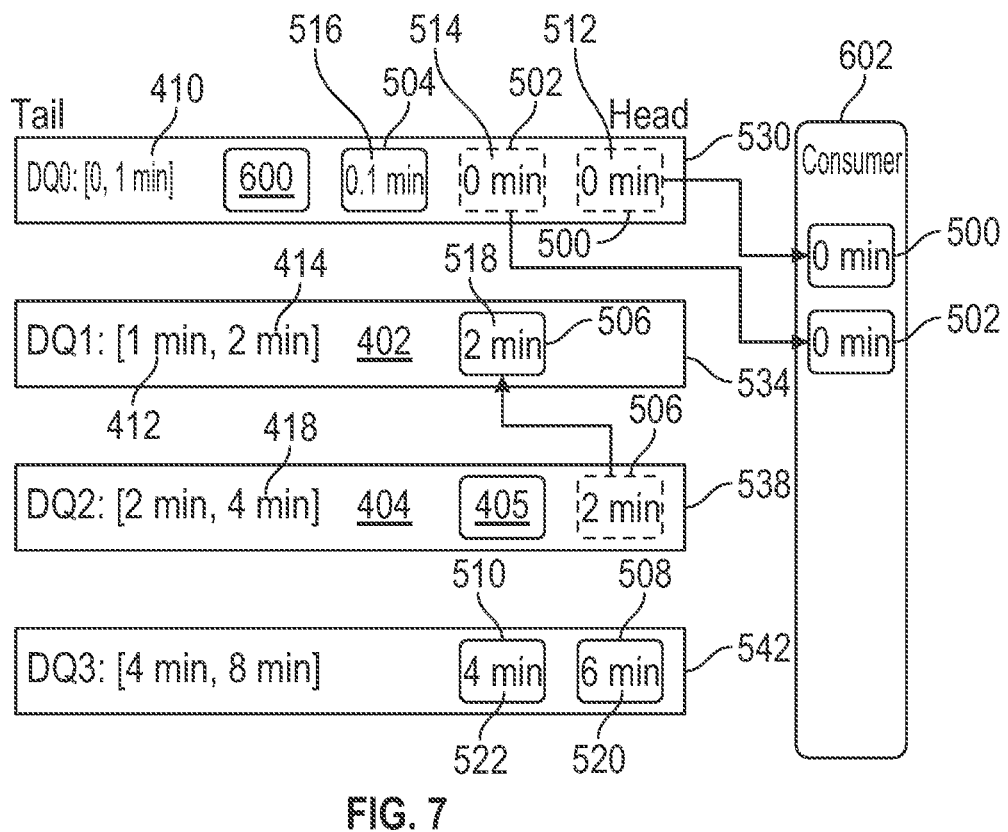

Still sticking with the example, after the passage of 0.9 minutes, the target delivery times 518-522 can be compared against the upper bounds 410, 414, and 418. Furthermore, a determination can be made if any of the target delivery times 512-522 are zero minutes. Here, the detector 405 determines that the target delivery time 518 is two minutes and now falls within the range defined by the lower bound 412 and the upper bound 414. As shown in FIG. 7, the message 506 is moved from the delay queue 404 to the delay queue 402 during the operation 210. In addition, the detector 600 determines that the target delivery times 512 and 514 are zero minutes. Thus, the detector 600 moves the messages 500 and 502 to the consumer queue 602. Here, the messages 500 and 502 can be formed as a group of messages where the group can be moved based on the passage of the delay time. In the example, once messages are moved to the consumer queue 602, the user 128, who can be a consumer, can consume the messages.

Once the operation 210 is performed, a determination is made that the delay queues 400, 402, and 406 have the messages 504-510 during the operation 212. As such, the operations 208 and 210 are repeated. During the operation 208, a determination is made that the delay time is 0.1 minutes using the methodologies discussed above, i.e., each of the detectors 403, 405, and 407 compare the target delivery times 516, 518, and 520 associated with the messages 504, 506, and 508 that are nearest the delay queue head ends 530, 534, and 542 with the upper bounds 410, 414, and 418 of the delay queues 400, 402, and 404. The detector 600 also compares the time to zero of the target delivery time 516 of the message 504. Moreover, during the operation 208, a passage of the 0.1 minutes is detected.

Figure 8:
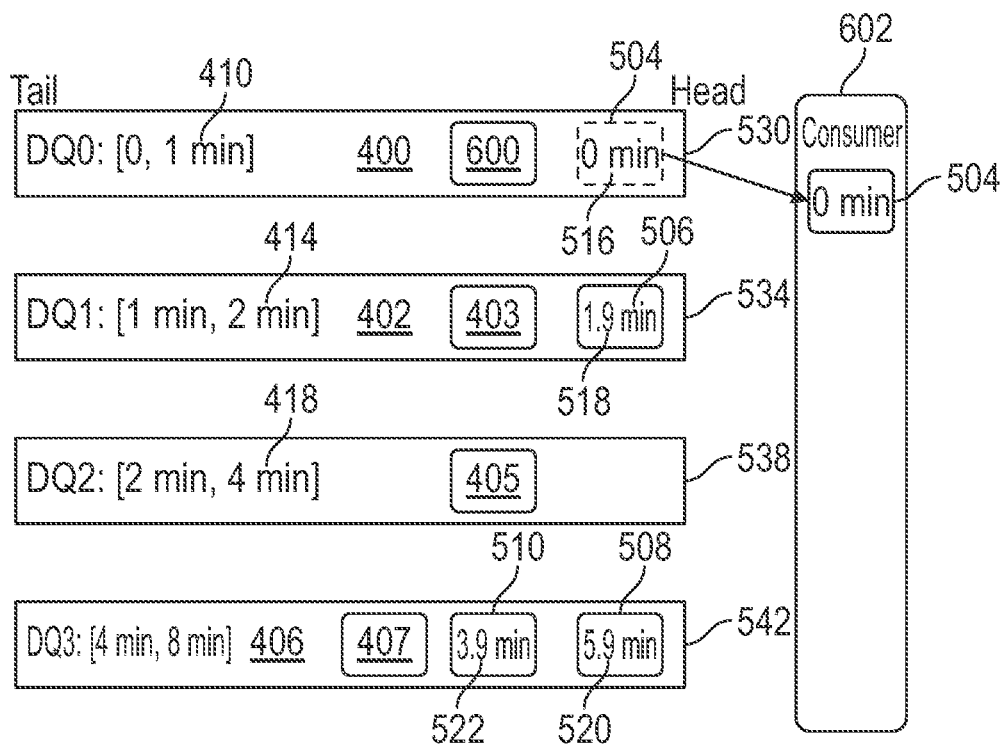

After the passage of 0.1 minutes, the target delivery times 518-522 can be compared against the upper bounds 410, 414, and 418. A determination can also be made if any of the target delivery times 516-522 are zero minutes. As shown in FIG. 8, the detector 600 determines that the target delivery time 516 is zero minutes. Thus, the detector 600 moves the message 504 to the consumer queue 602 during the operation 210.

Once the operation 210 is performed, a determination is made that the delay queues 402 and 406 have the messages 506-510 during the operation 212. As such, the operations 208 and 210 are repeated. At the operation 208, a determination is made that the delay time is 0.9 minutes where each of the detectors 403 and 407 compare the target delivery times 518 and 520 associated with the messages 506 and 508 that are nearest the delay queue head ends 534 and 542 with the upper bounds 410, 414, and 418 of the delay queues 400, 402, and 404. Moreover, during the operation 208, a passage of the 0.9 minutes is detected.

Figure 9:
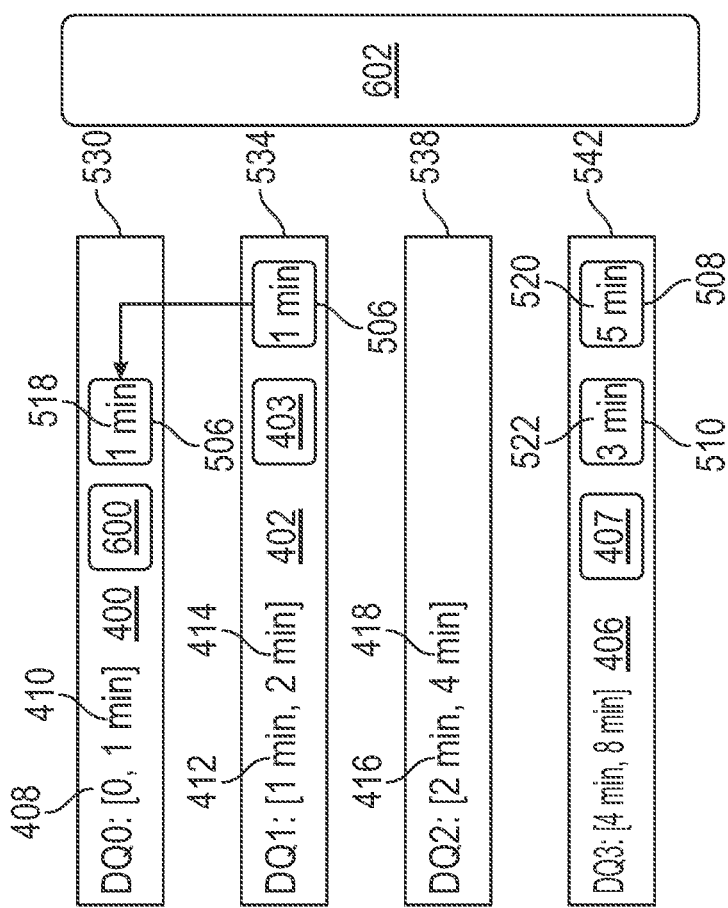

After the passage of 0.9 minutes, the target delivery times 518-522 can be compared against the upper bounds 410, 414, and 418. A determination can also be made if any of the target delivery times 518-522 are zero minutes. The detector 403 determines that the target delivery time 518 is 1.0 minutes, which is within the range defined by lower bound 408 and the upper bound 410. Thus, the detector 403 moves the message 506 to the delay queue 400 during the operation 210, as shown in FIG. 9. A determination is then made that the delay queues 400 and 406 have the messages 506-510. Thus, the operations 208 and 210 are repeated.

During the operation 208, a determination is made that the delay time is one minute where the detector 407 compares the target delivery time 520 associated with the message that is nearest the delay queue head ends 530 and 542 with the upper bounds 410, 414, and 418 of the delay queues 400, 402, and 404. Moreover, during the operation 208, a passage of the 1.0 minutes is detected.

Figure 10:
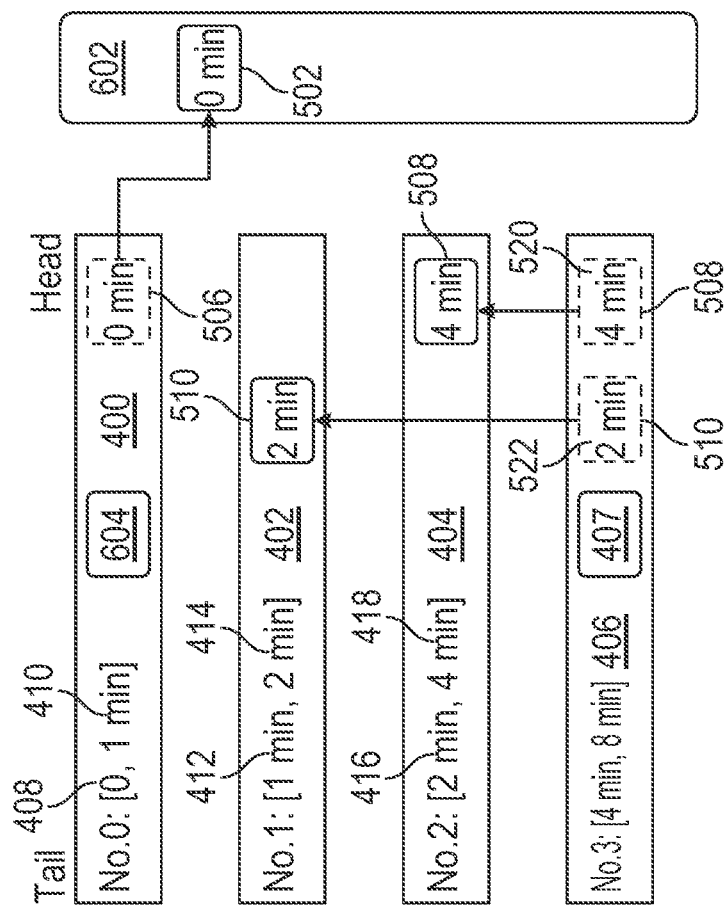

After the passage of one minute, the target delivery times 520 and 522 can be compared against the upper bounds 410, 414, and 418. A determination can also be made if any of the target delivery times 518 and 520 are zero minutes. The detector 600 determines that the target delivery time 518 is 0.0 minutes. As such, the detector 600 moves the message 506 to the consumer queue 602 as shown in FIG. 10. Moreover, the detector 407 compares the target delivery times 520 and 522 against the upper bounds 410, 414, and 418 to determine if the messages 508 and 510 should be moved. The detector 407 determines that the target delivery time 520 is within the range defined by the lower bound 416 and the upper bound 418. Thus, the detector 407 moves the message 508 to the delay queue 404. In addition, the detector 407 determines that the target delivery time 522 of the message 510 is within the range defined by lower bound 412 and the upper bound 414. Thus, the detector 407 moves the message 510 to the delay queue 402 thereby skipping the delay queue 404 during the operation 210, as shown in FIG. 10.

Figure 11:
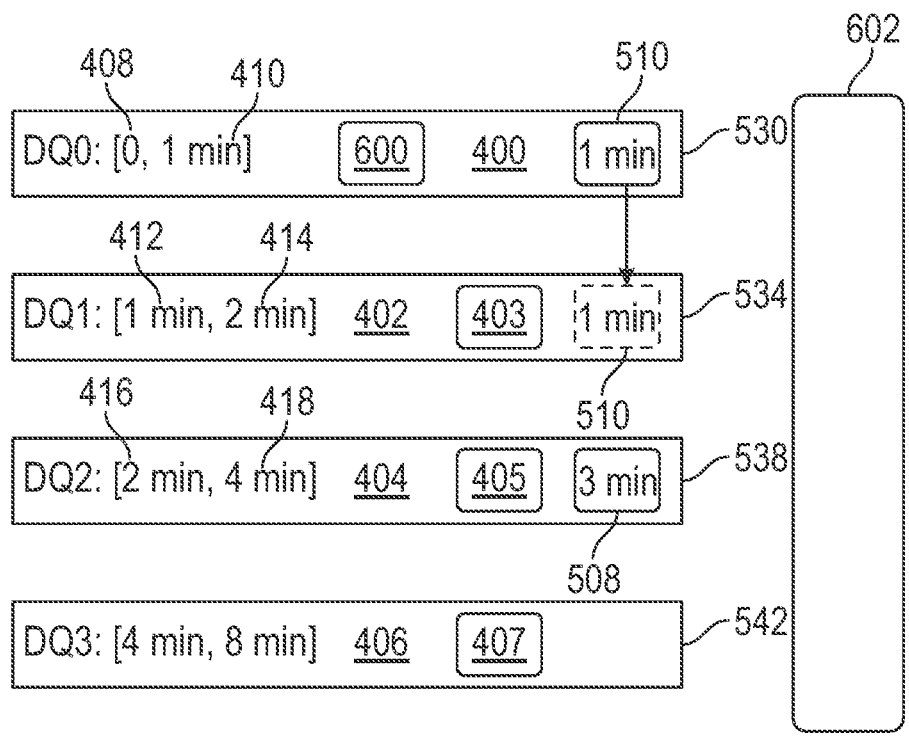
Figure 12:
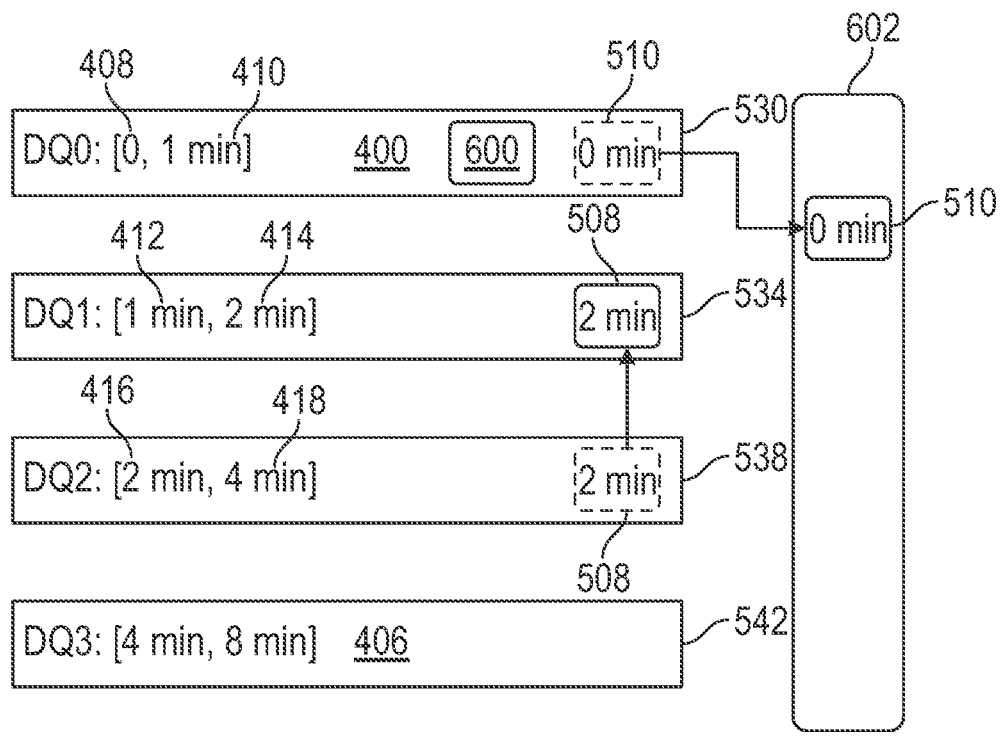
Figure 13:
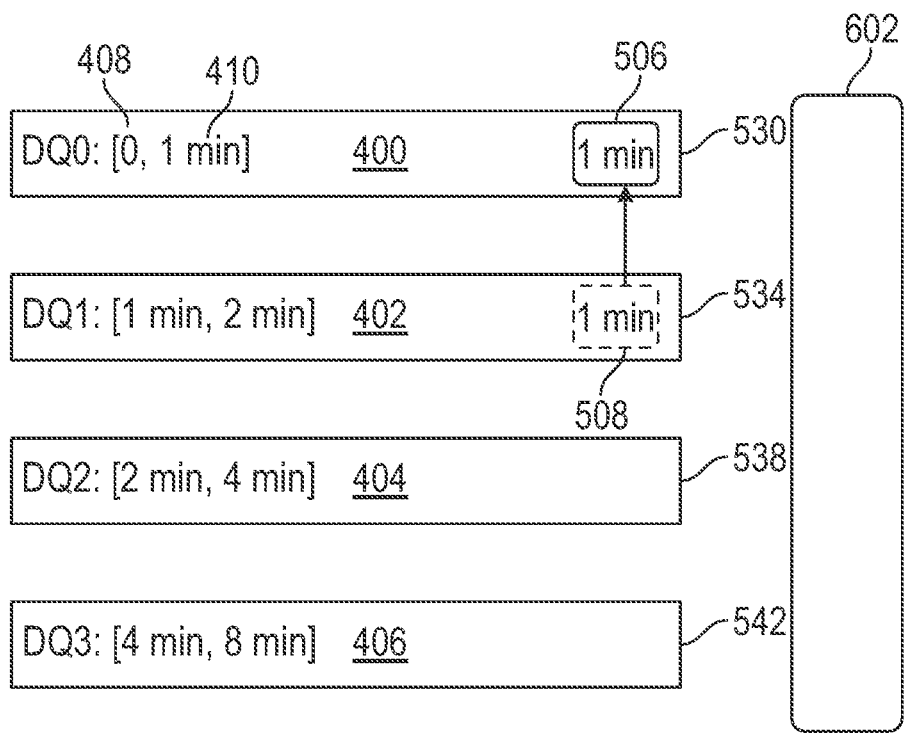
Figure 14:
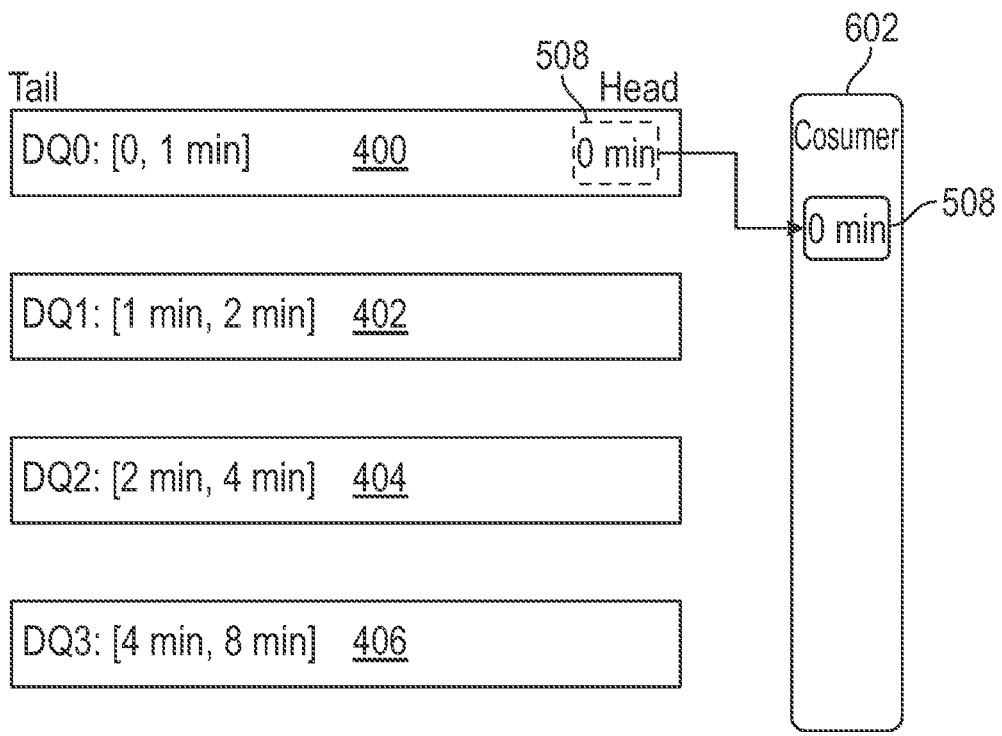

After the detector 407 moves the message 510 to the delay queue 402, the operations 208-212 are repeated as shown in FIGS. 11-13 until a determination is made in the operation that all of the delay queues 400-406 are clear, as shown in FIG. 14.

In the above examples, only the messages, such as the messages 500, and 508, which were closest to the delay queue head ends 530 542 could be moved. However, in further examples, any of the messages 500-510, regardless of the position relative to the delay queue head ends, could be moved. Thus, in FIG. 6, the detector 600 can move the message 502 into the consumer queue 602 by leap frogging the message 502 over the message 500 and into the consumer queue. Here, when the message 502 is moved, the message 500 can remain in the delay queue 400 after the message 502 has been moved into the consumer queue since the detector 600 caused the message 502 to skip over the message 500.

While the target delivery times of the messages closest to the delay queue head ends are described as being used to determine the delay time, any or all of the messages and their accompanying target delivery times can be used to determine a delay time during the operation 206. Thus, in FIG. 6, during the operation 206, the detector 600 can use all of the target delivery times 512-516 or any combination thereof when determining a time to zero instead of just the target delivery time 512 as described above. Moreover, the detector 407 can use the target delivery times 520 and 522 during the operation 206 instead of just the target delivery time 520 as described above.

In the example discussed above with reference to FIGS. 5-14, three messages, such as the messages 500, 502, and 506 were simultaneously moved during a single instance of the operation 210. In further examples, any number of messages can be simultaneously moved during the operation 210. Thus, four, five, etc. messages can be simultaneously moved.

Figure 15:
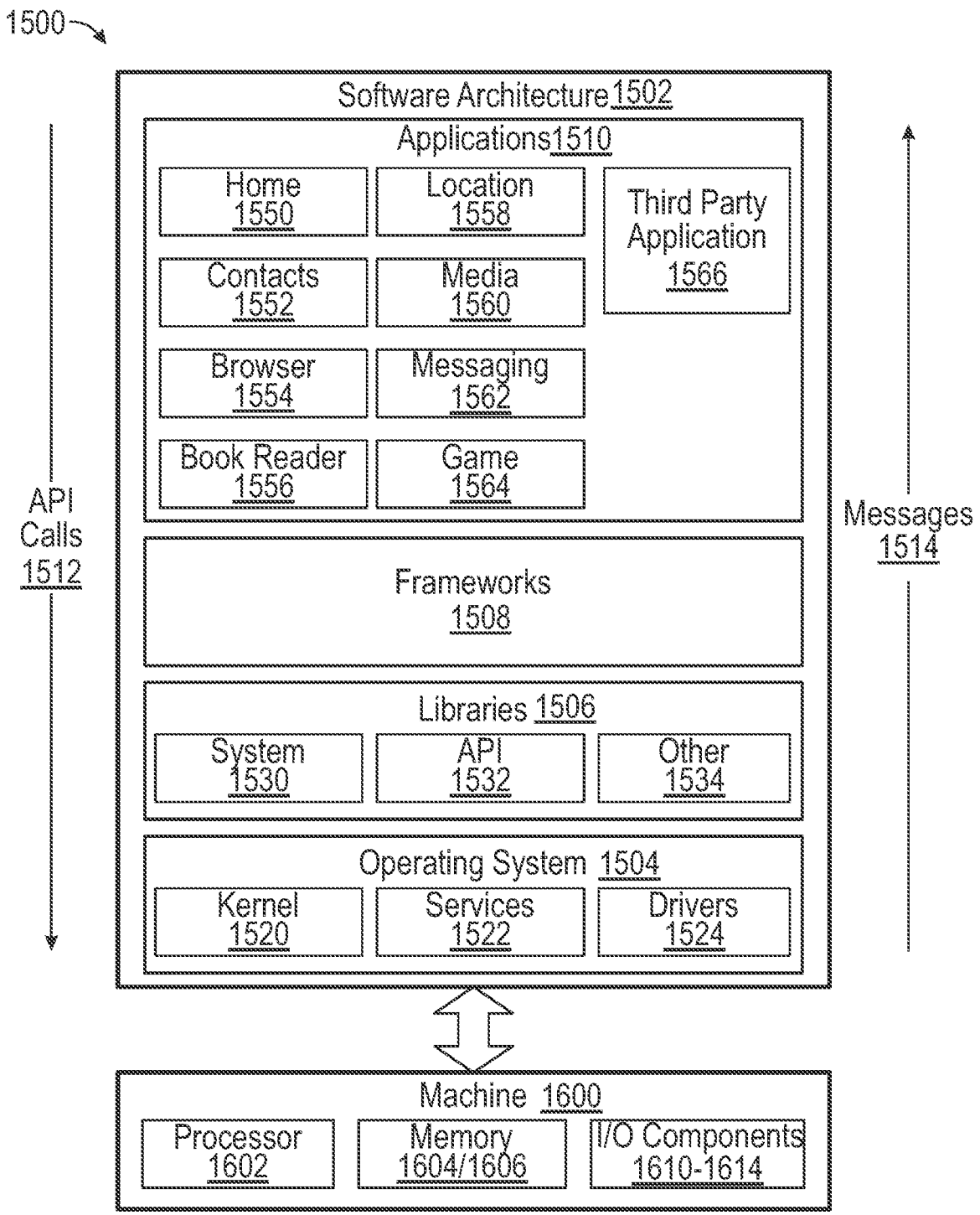
FIG. 15 is a block diagram illustrating an architecture of software used to create a delay queue architecture and manage the transmission of messages between a producer and consumer, according to some examples.
Figure 16:
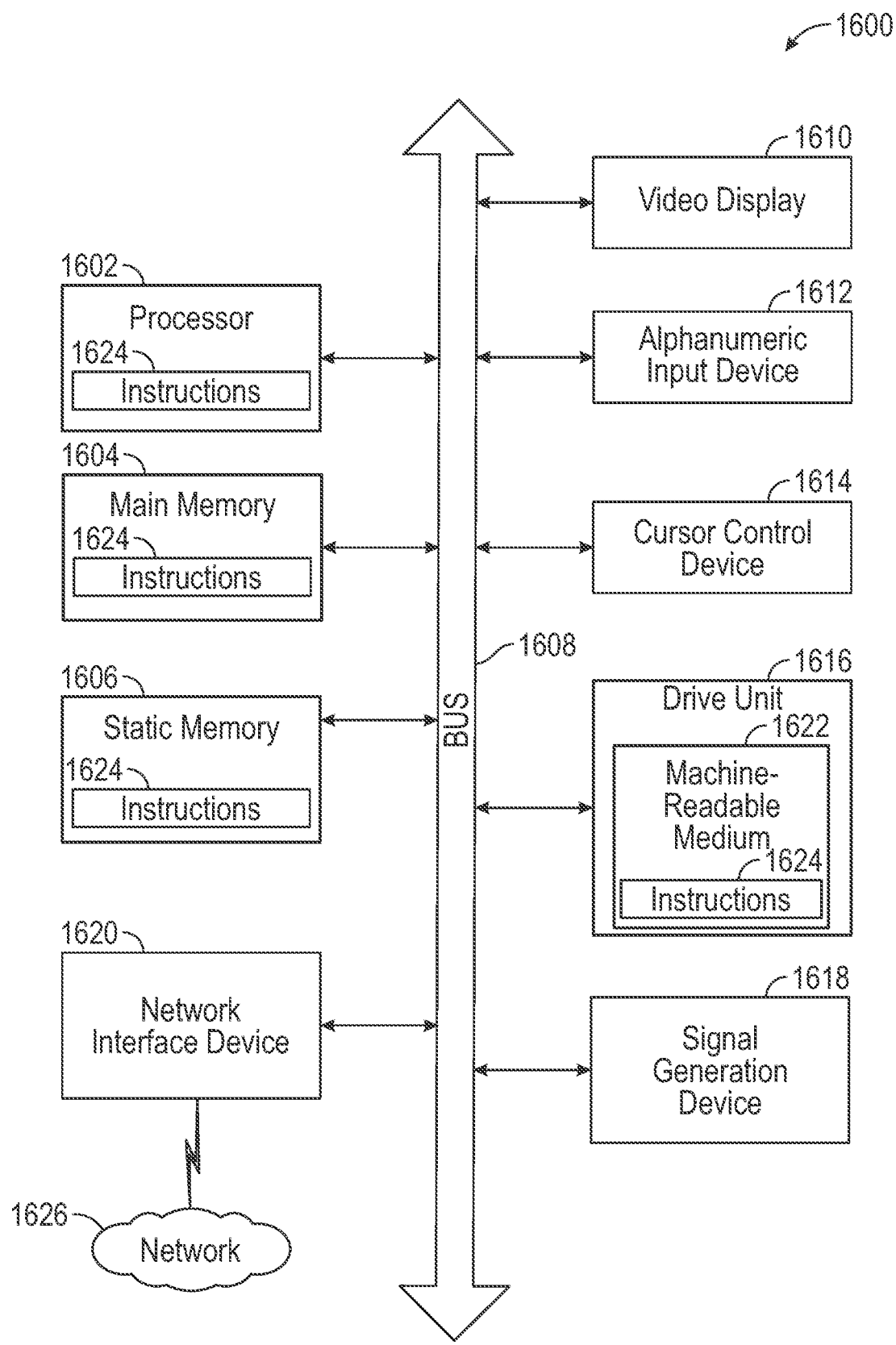
FIG. 16 shows a machine as an example computer system with instructions to cause the machine to create a delay queue architecture and manage the transmission of messages between a producer and consumer, according to some examples.

FIG. 15 is a block diagram 1500 illustrating a software architecture 1502, which may be installed on any one or more of the devices described above. FIG. 16 is merely a non-limiting example of a software architecture, and it will be appreciated that many other architectures may be implemented to facilitate the functionality described herein. The software architecture 1502 may be implemented by hardware such as a machine 1600 of FIG. 16 that includes a processor 1602, memory 1604 and 1606, and I/O components 1610-1614. In this example, the software architecture 1502 may be conceptualized as a stack of layers where each layer may provide a particular functionality. For example, the software architecture 1502 includes layers such as an operating system 1504, libraries 1506, frameworks 1508, and applications 1510. Operationally, the applications 1510 invoke application programming interface (API) calls 1512 through the software stack and receive messages 1514 in response to the API calls 1512, according to some implementations.

In various implementations, the operating system 1504 manages hardware resources and provides common services. The operating system 1504 includes, for example, a kernel 1520, services 1522, and drivers 1524. The kernel 1520 acts as an abstraction layer between the hardware and the other software layers in some implementations. For example, the kernel 1520 provides memory management, processor management (e.g., scheduling), component management, networking, and security settings, among other functionality. The services 1522 may provide other common services for the other software layers. The drivers 1524 may be responsible for controlling or interfacing with the underlying hardware. For instance, the drivers 1524 may include display drivers, camera drivers, Bluetooth© drivers, flash memory drivers, serial communication drivers (e.g., Universal Serial Bus (USB) drivers), Wi-Fi© drivers, audio drivers, power management drivers, and so forth.

In some implementations, the libraries 1506 provide a low-level common infrastructure that may be utilized by the applications 1510. The libraries 1506 may include system libraries 1530 (e.g., C standard library) that may provide functions such as memory allocation functions, string manipulation functions, mathematic functions, and the like. In addition, the libraries 1506 may include API libraries 1532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1506 may also include a wide variety of other libraries 1534 to provide many other APIs to the applications 1510.

The frameworks 1508 provide a high-level common infrastructure that may be utilized by the applications 1510, according to some implementations. For example, the frameworks 1508 provide various graphic user interface (GUI) functions, high-level resource management, high-level location services, and so forth. The frameworks 1508 may provide a broad spectrum of other APIs that may be utilized by the applications 1510, some of which may be specific to a particular operating system or platform.

In an example, the applications 1510 include a home application 1550, a contacts application 1552, a browser application 1554, a book reader application 1556, a location application 1558, a media application 1560, a messaging application 1562, a game application 1564, and a broad assortment of other applications such as a third-party application 1566. According to some examples, the applications 1510 are programs that execute functions defined in the programs. Various programming languages may be employed to create one or more of the applications 1510, structured in a variety of manners, such as object-orientated programming languages (e.g., Objective-C, Java, or C++) or procedural programming languages (e.g., C or assembly language). In a specific example, the third-party application 1566 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1566 may invoke the API calls 1512 provided by the mobile operating system (e.g., the operating system 1504) to facilitate functionality described herein.

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client or server computer system) or one or more processors may be configured by software (e.g., an application or application portion) as a hardware-implemented module that operates to perform certain operations as described herein.

In various examples, a hardware-implemented module may be implemented mechanically or electronically. For example, a hardware-implemented module may include dedicated circuitry or logic that is permanently configured (e.g., as a special-purpose processor, such as a field programmable gate array (FPGA) or an application-specific integrated circuit (ASIC)) to perform certain operations. A hardware-implemented module may also include programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering examples in which hardware-implemented modules are temporarily configured (e.g., programmed), each of the hardware-implemented modules need not be configured or instantiated at any one instance in time. For example, where the hardware-implemented modules include a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses) that connects the hardware-implemented modules. In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, include processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but also deployed across a number of machines. In some examples, the processor or processors may be located in a single location (e.g., within a home environment, an office environment or as a server farm), while in other examples, the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via the network 108 (e.g., the Internet) and via one or more appropriate interfaces (e.g., application program interfaces (APIs).)

Examples may be implemented in digital electronic circuitry, or in computer hardware, firmware, software, or in combinations of them. Examples may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers, at one site or distributed across multiple sites, and interconnected by a communication network.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various examples.

FIG. 16 is a block diagram of a machine within which instructions may be executed for causing the machine to perform any one or more of the methodologies discussed herein. In one example, the machine may be any of the devices described above. In alternative examples, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that, individually or jointly, execute a set (or multiple sets) of instructions to perform any one or more of the methodologies discussed herein.

The example computer system 1600 includes a processor 1602 (e.g., a central processing unit (CPU), a graphics processing unit (GPU) or both), a main memory 1604 and a static memory 1606, which communicate with each other via a bus 1608. The computer system 1600 may further include a video display unit 1610 (e.g., a liquid crystal display (LCD) or a cathode ray tube (CRT)). The computer system 1600 also includes an alphanumeric input device 1612 (e.g., a keyboard), a user interface (UI) navigation device (cursor control device) 1614 (e.g., a mouse), a disk drive unit 1616, a signal generation device 1618 (e.g., a speaker) and a network interface device 1620.

The drive unit 1616 includes a machine-readable medium 1622 on which is stored one or more sets of instructions and data structures (e.g., software) 624 embodying or utilized by any one or more of the methodologies or functions described herein. The instructions 1624 may also reside, completely or at least partially, within the main memory 1604 and/or within the processor 1602 during execution thereof by the computer system 1600, the main memory 1604 and the processor 1602 also constituting machine-readable media. Instructions 1624 may also reside within the static memory 1606.

While the machine-readable medium 1622 is shown in an example to be a single medium, the term "machine-readable medium" may include a single medium or multiple media (e.g., a centralized or distributed database, and/or associated caches and servers) that store the one or more instructions or data instructions 1624. The term "machine-readable medium" shall also be taken to include any tangible medium that is capable of storing, encoding or carrying instructions 1624 for execution by the machine and that cause the machine to perform any one or more of the methodologies of the present invention, or that is capable of storing, encoding or carrying data structures utilized by or associated with such instructions 1624. The term "machine-readable medium" shall accordingly be taken to include, but not be limited to, solid-state memories, and optical and magnetic media. Specific examples of machine-readable media include non-volatile memory, including by way of example, semiconductor memory devices, e.g., erasable programmable read-only memory (EPROM), electrically erasable programmable read-only memory (EEPROM), and flash memory devices; magnetic disks, such as internal hard disks and removable disks; magneto-optical disks; and CD-ROM and DVD-ROM disks.

The instructions 1624 may further be transmitted or received over a communications network 1626 using a transmission medium. The instructions 1624 may be transmitted using the network interface device 1620 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding or carrying instructions 1624 for execution by the machine, and includes digital or analog communications signals or other intangible media to facilitate communication of such software.

In various example examples, one or more portions of the network 1626 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1626 or a portion of the network 1626 may include a wireless or cellular network, and the coupling 682 may be a Code Division Multiple Access (CDMA) connection, a Global System for Mobile communications (GSM) connection, or another type of cellular or wireless coupling. In this example, a coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology. Although an example has been described with reference to specific examples, it will be evident that various modifications and changes may be made to these examples without departing from the broader spirit and scope of the invention. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

Such examples of the inventive subject matter may be referred to herein, individually and/or collectively, by the term "invention" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A method for message orchestration using messaging queue, the method comprising:
    creating, by at least one hardware processor, an ordered sequence of delay queues, each delay queue of the ordered sequence of delay queues being assigned a position in the ordered sequence based on a fixed delay time associated with the delay queue having a time range with an upper bound and a lower bound;
    assigning a first message to a first delay queue of the delay queues in the ordered sequence of the delay queues and a second message to a second delay queue in the delay queues in the ordered sequence of the delay queues based on a first target delivery time associated with the first message falling within the upper bound of the time range and the lower bound of the time range associated with the first delay queue and a second target delivery time associated with the second message falling within the upper bound and the lower bound of the time range associated with the second delay queue;
    comparing the first target delivery time with the upper bound of the delay queue preceding the first delay queue, and the second target delivery time with the upper bound of the delay queue preceding the second delay queue;
    determining a first time difference between the first target delivery time and the upper bound of the time range associated with the delay queue preceding the first delay queue;
    determining a second time difference between the second target delivery time and the upper bound of the time range associated with the delay queue preceding the second delay queue;
    comparing the first time difference with the second time difference;
    assigning a time delay based on the comparison, wherein the time delay is based on a lower value of the first time difference and the second time difference;
    detecting a passage of the time delay; and
    moving the second message to the first delay queue based on the passage of the time delay.

2. The method of claim 1, further comprising:
    moving a third message assigned to a third delay queue of the ordered sequence of the delay queues to the second delay queue from the third delay queue based on the passage of the time delay;
    moving a fourth message assigned to a fourth delay queue of the ordered sequence of the delay queues to the third delay queue from the fourth delay queue based on the passage of the time delay; and
    moving the first message from the first delay queue to a recipient based on the passage of the time delay.

3. The method of claim 2, wherein the first message, the second message, the third message, and the fourth message are moved simultaneously.

4. The method of claim 1, wherein:
the first delay queue has a first starting time period and a first ending time period, the first starting time period and the first ending time period being based on the time delay and a first position of the first delay queue within the ordered sequence of the delay queues, and
the second delay queue has a second starting time period and a second ending time period, the second starting time period and the second ending time period being based on a second time delay and a second position of the second delay queue within the ordered sequence of the delay queues.

5. The method of claim 4, wherein the second message has a second time delay associated therewith and the second message is moved from the second delay queue to the first delay queue after the passage of the time delay and a remainder of the second time delay is the same as or less than the first ending time period after the passage of the time delay.

6. The method of claim 1, wherein:
the second delay queue includes a plurality of messages,
the second message is a first logical message in the plurality of messages, and
the first logical message is moved before other messages in the plurality of messages.

7. The method of claim 1, wherein the second delay queue includes a plurality of messages and the method further comprises:
forming a group of messages having ones of the plurality of messages; and
moving the group of messages based on the passage of the time delay.

8. The method of claim 1, wherein the time delay is user-selectable.

9. A device for message orchestration using messaging queue, the device comprising:
a processor; and
memory including instructions that, when executed by the processor, cause the device to perform operations including:
creating, by at least one hardware processor, an ordered sequence of delay queues, each delay queue of the ordered sequence of delay queues being assigned a position in the ordered sequence based on a fixed delay time associated with the delay queue having a time range with an upper bound and a lower bound;
assigning a first message to a first delay queue of the delay queues in the ordered sequence of the delay queues and a second message to a second delay queue in the delay queues in the ordered sequence of the delay queues based on a first target delivery time associated with the first message falling within the upper bound of the time range and the lower bound of the time range associated with the first delay queue and a second target delivery time associated with the second message falling within the upper bound and the lower bound of the time range associated with the second delay queue;
comparing the first target delivery time with the upper bound of the delay queue preceding the first delay queue, and the second target delivery time with the upper bound of the delay queue preceding the second delay queue;
determining a first time difference between the first target delivery time and the upper bound of the time range associated with the delay queue preceding the first delay queue;
determining a second time difference between the second target delivery time and the upper bound of the time range associated with the delay queue preceding the second delay queue;
comparing the first time difference with the second time difference;
assigning a time delay based on the comparison, wherein the time delay is based on a lower value of the first time difference and the second time difference;
detecting a passage of the time delay; and
moving the second message to the first delay queue based on the passage of the time delay.

10. The device of claim 9, wherein the instructions further cause the device to perform operations including:
moving a third message assigned to a third delay queue of the ordered sequence of the delay queues to the second delay queue from the third delay queue based on the passage of the time delay;
moving a fourth message assigned to a fourth delay queue of the ordered sequence of the delay queues to the third delay queue from the fourth delay queue based on the passage of the time delay; and
moving the first message from the first delay queue to a recipient based on the passage of the time delay, wherein the first message, the second message, the third message, and the fourth message are moved simultaneously.

11. The device of claim 9, wherein:
the first delay queue has a first starting time period and a first ending time period, the first starting time period and the first ending time period being based on the time delay and a first position of the first delay queue within the ordered sequence of the delay queues, and
the second delay queue has a second starting time period and a second ending time period, the second starting time period and the second ending time period being based on a second time delay and a second position of the second delay queue within the ordered sequence of the delay queues, wherein the second message has a second time delay associated therewith and the second message is moved from the second delay queue to the first delay queue after the passage of the time delay and a remainder of the second time delay is the same as or less than the first ending time period after the passage of the time delay.

12. The device of claim 9, wherein:
the second delay queue includes a plurality of messages,
the second message is a first logical message in the plurality of messages, and
the first logical message is moved before other messages in the plurality of messages.

13. The device of claim 9, wherein the second delay queue includes a plurality of messages and the instructions further cause the device to perform operations including:
forming a group of messages having ones of the plurality of messages; and
moving the group of messages based on the passage of the time delay.

14. A non-transitory machine-readable medium having instructions embodied thereon, the instructions executable by a processor of a machine to perform operations for message orchestration using messaging queue comprising:
creating, by at least one hardware processor, an ordered sequence of delay queues, each delay queue of the ordered sequence of delay queues being assigned a position in the ordered sequence based on a fixed delay time associated with the delay queue having a time range with an upper bound and a lower bound;

assigning a first message to a first delay queue of the delay queues in the ordered sequence of the delay queues and a second message to a second delay queue in the delay queues in the ordered sequence of the delay queues based on a first target delivery time associated with the first message falling within the upper bound of the time range and the lower bound of the time range associated with the first delay queue and a second target delivery time associated with the second message falling within the upper bound and the lower bound of the time range associated with the second delay queue;

comparing the first target delivery time with the upper bound of the delay queue preceding the first delay queue, and the second target delivery time with the upper bound of the delay queue preceding the second delay queue;

determining a first time difference between the first target delivery time and the upper bound of the time range associated with the delay queue preceding the first delay queue;

determining a second time difference between the second target delivery time and the upper bound of the time range associated with the delay queue preceding the second delay queue;

comparing the first time difference with the second time difference;

assigning a time delay based on the comparison, wherein the time delay is based on a lower value of the first time difference and the second time difference;

detecting a passage of the time delay; and moving the second message to the first delay queue based on the passage of the time delay.

15. The non-transitory machine-readable medium of claim 14, the operations further comprising:

moving a third message assigned to a third delay queue of the ordered sequence of the delay queues to the second delay queue from the third delay queue based on the passage of the time delay;

moving a fourth message assigned to a fourth delay queue of the ordered sequence of the delay queues to the third delay queue from the fourth delay queue based on the passage of the time delay; and moving the first message from the first delay queue to a recipient based on the passage of the time delay, wherein the first message, the second message, the third message, and the fourth message are moved simultaneously.

16. The non-transitory machine-readable medium of claim 14, wherein:

the first delay queue has a first starting time period and a first ending time period, the first starting time period and the first ending time period being based on the time delay and a first position of the first delay queue within the ordered sequence of the delay queues, and the second delay queue has a second starting time period and a second ending time period, the second starting time period and the second ending time period being based on a second time delay and a second position of the second delay queue within the ordered sequence of the delay queues, wherein the second message has a second time delay associated therewith and the second message is moved from the second delay queue to the first delay queue after the passage of the time delay and a remainder of the second time delay is the same as or less than the first ending time period after the passage of the time delay.

17. The non-transitory machine-readable medium of claim 14, wherein:

the second delay queue includes a plurality of messages, the second message is a first logical message in the plurality of messages, and the first logical message is moved before other messages in the plurality of messages.

* * * * *